(12) United States Patent
Hsieh et al.

(10) Patent No.: US 11,662,525 B1
(45) Date of Patent: May 30, 2023

(54) OPTICAL SYSTEM

(71) Applicant: VisEra Technologies Company Ltd., Hsin-Chu (TW)

(72) Inventors: Hsin-Yi Hsieh, Taoyuan (TW); Chin-Chuan Hsieh, Hsin-Chu (TW)

(73) Assignee: VisEra Technologies Company Ltd., Hsin-Chu (TW)

( * ) Notice: Subject to any disclaimer, the term of this patent is extended or adjusted under 35 U.S.C. 154(b) by 0 days.

(21) Appl. No.: 17/547,021

(22) Filed: Dec. 9, 2021

(51) Int. Cl.
*G02B 6/34* (2006.01)
*G02B 6/124* (2006.01)
*G02B 6/42* (2006.01)

(52) U.S. Cl.
CPC .............. *G02B 6/34* (2013.01); *G02B 6/124* (2013.01); *G02B 6/42* (2013.01)

(58) Field of Classification Search
CPC . G02B 6/34; G02B 6/12; G02B 6/122; G02B 6/124; G02B 6/12004; G02B 6/42
See application file for complete search history.

(56) References Cited

U.S. PATENT DOCUMENTS

| | | | |
|---|---|---|---|
| 2004/0004767 A1 | 1/2004 | Song | |
| 2004/0264840 A1* | 12/2004 | Mule | G02B 6/10 385/14 |
| 2015/0184829 A1* | 7/2015 | Baek | F21S 43/15 362/346 |
| 2015/0260995 A1* | 9/2015 | Mukawa | G02B 23/14 345/8 |
| 2017/0031171 A1* | 2/2017 | Vallius | G02B 5/1819 |
| 2017/0307886 A1* | 10/2017 | Stenberg | G02B 6/0035 |
| 2019/0086674 A1 | 3/2019 | Sinay et al. | |
| 2020/0225479 A1* | 7/2020 | Chi | G02F 1/011 |
| 2021/0055555 A1 | 2/2021 | Chi et al. | |
| 2021/0072437 A1 | 3/2021 | Singh et al. | |

FOREIGN PATENT DOCUMENTS

| | | |
|---|---|---|
| JP | 2007279313 | 10/2007 |
| JP | 2015175967 | 10/2015 |
| JP | 2020144190 | 9/2020 |
| JP | 2021086069 | 6/2021 |
| JP | 2021096251 | 6/2021 |
| JP | 2022129525 | 9/2022 |
| WO | 2021091622 | 5/2021 |

OTHER PUBLICATIONS

Zhang, Yue et al.; Development of planar diffractive waveguides in optical see-through head-mounted displays; Precision Engineering 60 (2019) 482-496.

* cited by examiner

*Primary Examiner* — Michael P Mooney
(74) *Attorney, Agent, or Firm* — Liu & Liu

(57) ABSTRACT

An optical system includes a light module, an optical element on a first grating coupler, and a second grating coupler. The light module emits three beams from different positions. The optical element is below the light module and is configured to change incident angles of the three beams and to focus the three beams at the same region of the first grating coupler. The first grating coupler is below the optical element and is configured to couple the three beams into a light-guide substrate. The light-guide substrate is connected to the first grating coupler and is configured to transmit the three beams. The second grating coupler is connected to the light-guide substrate and is configured to enable the three beams departing from the light-guide substrate after the three beams have traveled the same optical path.

20 Claims, 16 Drawing Sheets

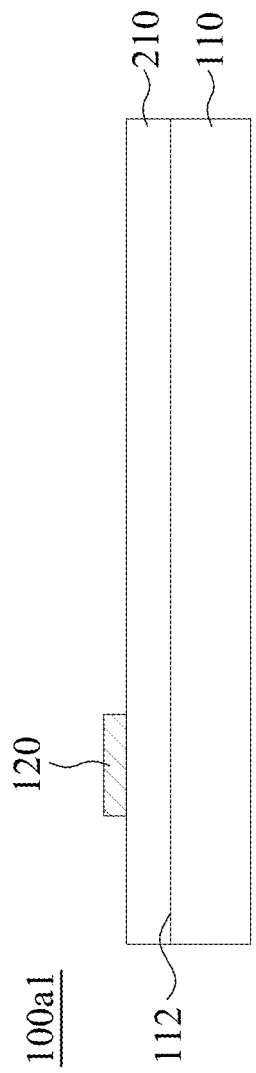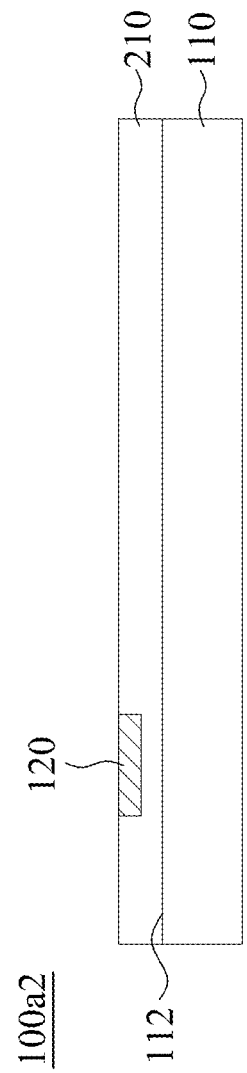

OPTICAL SYSTEM

BACKGROUND

Field of Invention

The present disclosure relates to an optical system. More particularly, the optical system includes one pair of grating couplers on one light-guide substrate.

Description of Related Art

A grating coupler is often used for imaging or message delivery by transmitting an external light into and out of a light-guide (waveguide) layer on an optical device, such as a photonic chip. Due to the high refractive index light-guide is surrounded by low refractive index claddings, light traveling in the light-guide with an angle greater than the critical angles of the interfaces between the light-guide layer and the cladding layers will result in a total internal reflection (TIR) phenomenon near the interfaces. Thus, the light can propagate without extreme energy loss in the light-guide. The grating structure on the light-guide is used for light propagation in the light-guide to introduce an external light and convert it to first order diffractive light with a first diffractive angle, which is greater than the critical angles of the interfaces. Moreover, the grating geometry, materials, and design can determine the energy conversion efficiency from the incidence to the first order diffraction light. Grating light-guides or waveguides have been widely applied in biosensors, augmented reality (AR), virtual reality (VR), and telecommunications.

For colored images, the external light includes several wavelengths having different colors, such as RGB lights. When the colored image with different wavelengths couples into the same grating light-guide, their first diffractive angles will be different and will likely result in different optical paths of the RGB lights, thereby causing the problem of imaging at the grating coupling out region. Therefore, there is a need to solve the above problems.

SUMMARY

One aspect of the present disclosure is to provide an optical system. The optical system includes a light module, an optical element on a first grating coupler, and a second grating coupler. The light module emits three collimating beams from different positions. The optical element is below the light module and is configured to change incident angles of the three collimating beams and to focus the three collimating beams at the same region of the first grating coupler. The first grating coupler is below the optical element and is configured to couple the three beams into a light-guide substrate. The light-guide substrate is connected to the first grating coupler and is configured to transmit the three beams. The second grating coupler is connected to the light-guide substrate and is configured to enable the three beams departing from the light-guide substrate after the three beams have traveled the same optical path (with the same diffractive angle of the first order diffraction lights).

According to some embodiments of the present disclosure, the optical system further includes a cladding layer covering the first grating coupler, the second grating coupler, and the light-guide substrate.

According to some embodiments of the present disclosure, the cladding layer is an air gap, and a thickness of the air gap is in a range from 0.1 mm to 100 mm.

According to some embodiments of the present disclosure, the optical system further includes a metal shielding between the optical element and the cladding layer.

According to some embodiments of the present disclosure, a refractive index of the light-guide substrate is greater than a refractive index of the cladding layer.

According to some embodiments of the present disclosure, a refractive index of the first grating coupler is greater than a refractive index of the cladding layer.

According to some embodiments of the present disclosure, a refractive index of the cladding layer is less than 1.6.

According to some embodiments of the present disclosure, the optical element is a prism or a microlens.

According to some embodiments of the present disclosure, the optical system further includes a metal shielding on the optical element.

According to some embodiments of the present disclosure, the optical system further includes a grating layer extending along a surface of the light-guide substrate.

According to some embodiments of the present disclosure, the grating layer has a portion between the first grating coupler and the light-guide substrate.

According to some embodiments of the present disclosure, the first grating coupler is disposed in the grating layer, and a surface of the first grating coupler faces toward the light-guide substrate.

According to some embodiments of the present disclosure, the optical system further includes a metal layer disposed between the first grating coupler and the light-guide substrate.

According to some embodiments of the present disclosure, the optical system further includes a cladding layer covering the first grating coupler, the second grating coupler, and the light-guide substrate, in which the grating layer is disposed between the light-guide substrate and the cladding layer.

According to some embodiments of the present disclosure, a refractive index of the light-guide substrate is in a range from 1.7 to 2.2.

According to some embodiments of the present disclosure, the first grating coupler includes a step grating structure, the step grating structure includes a first vertical sidewall, a second vertical sidewall, and a horizontal surface adjoining the first vertical sidewall and the second vertical sidewall.

According to some embodiments of the present disclosure, the step grating structure has n steps, where n is in a range from 3 to 32.

According to some embodiments of the present disclosure, the first grating coupler includes a blazed grating structure, the blazed grating structure includes an oblique sidewall extending from a top of the blazed grating structure to a bottom of the blazed grating structure, and a width of the blazed grating structure gradually increases from the top of the blazed grating structure to the bottom of the blazed grating structure.

According to some embodiments of the present disclosure, the first grating coupler includes a slanted grating structure, the slanted grating structure includes a first oblique sidewall, a second oblique sidewall, and a top surface adjoining the first oblique sidewall and the second oblique sidewall.

According to some embodiments of the present disclosure, the three collimating beams are three images, including a collimating image of red (R) light, another collimating image of green (G) light, and the other collimating image of blue (B) light.

According to some embodiments of the present disclosure, the light module includes a projector disposed above the optical element, in which the projector is configured to provide the three separated collimating RGB images.

According to some embodiments of the present disclosure, the light module further includes a splitter disposed between the optical element and the projector, in which the projector is configured to provide an overlapped colored image and the splitter is configured to separate the overlapped colored image into the three separated collimating RGB images.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A, FIG. 2A, FIG. 2B, FIG. 3A, FIG. 4A, FIG. 5, FIG. 6, FIG. 7, and FIG. 8 are cross-sectional views of optical devices in accordance with some embodiments of the present disclosure.

DETAILED DESCRIPTION

Figure 1B:
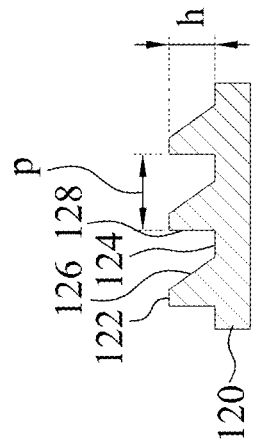
FIG. 1B, FIG. 3B, and FIG. 4B are enlargement views of grating couplers in FIG. 1A, FIG. 3A, and FIG. 4A, respectively.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. It should be understood that the number of any elements/components is merely for illustration, and it does not intend to limit the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

When a collimating light enters into a light-guide substrate or a glass through a grating coupler (GC), RGB lights would have different optical paths. Therefore, the RGB lights transmission to the viewer's eyes will shift. In order to solve this transmission imaging problem caused by the RGB lights having different optical paths, a plurality of grating coupler and/or a plurality of optical elements were used to achieve the same optical paths for imaging. For example, three separate high refractive index glasses were used for separately multiplexing three wavelengths (such as RGB wavelengths of lights) of an external light, and each of the glasses had at least one grating coupler, thereby transmitting the RGB wavelengths along the same optical paths. However, three separate high refractive index glasses would increase the thickness of the optical device and also increase the cost of manufacturing the optical device.

The coupling efficiency of a grating coupler of the collimating light would be relative to material properties of optical elements of an optical system and a structure of the grating coupler. The optical system of the present disclosure adjusts incident angles of three separated collimating RGB images emitted from different positions, and then couple the RGB images with one grating coupler and one light-guide substrate having a high refractive index. In addition, the present disclosure also provides a variety of grating structures, and those grating structures can provide high coupling efficiencies of the three RGB lights. The present disclosure can reduce the thickness of an optical device, and the disclosed grating structures provide greater field of views (FOV) and high coupling efficiency.

FIG. 1A, FIG. 2A, FIG. 2B, FIG. 3A, FIG. 4A, FIG. 5, FIG. 6, FIG. 7, and FIG. 8 are cross-sectional views of optical devices in accordance with some embodiments of the present disclosure.

Figure 1A:
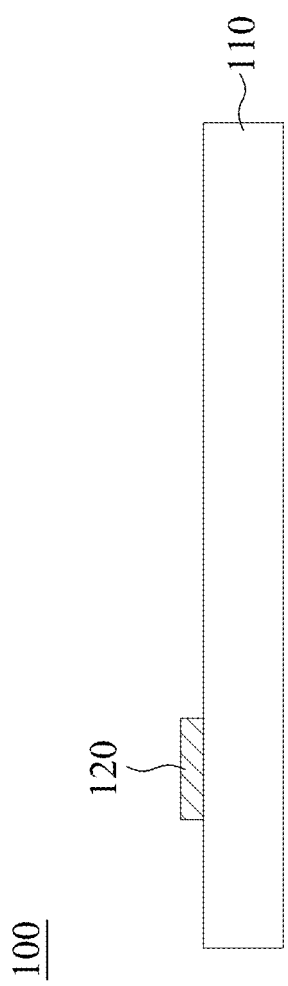

Please refer to FIG. 1A. An optical device 100 includes a light-guide substrate 110 and a grating coupler 120 on the light-guide substrate 110. The light-guide substrate 110 is a transparent substrate. In some embodiments, the light-guide substrate 110 may be a sapphire substrate. In some embodiments, the light-guide substrate 110 has a high refractive index (n), and the refractive index of the light-guide substrate 110 is in a range from 1.7 to 2.2, such as 1.8, 1.9, 2.0, or 2.1. In some embodiments, a refractive index of the grating coupler 120 is slightly lower than, the same as, or slightly higher than the refractive index of the light-guide substrate 110. In some embodiments, a thickness of the light-guide substrate 110 is in a range from 0.1 mm to 15 mm, such as 0.5, 0.8, 1, 3, 5, 7, 9, 11, or 13 mm. The thickness of the light-guide substrate 110 is greater than a thickness of the grating coupler 120.

Please refer to FIG. 1B. FIG. 1B illustrates an enlargement view of the grating coupler 120 in FIG. 1A. The grating coupler 120 has multiple convex parts and multiple recesses. The convex part of the grating coupler 120 has a height h from a top surface 122 of the convex part to a bottom surface 124 of the recess. The grating coupler 120 has a grating period p between two adjacent convex parts. The grating coupler 120 has a continuous surface including the top surface 122, a sidewall 126, a bottom surface 124, and a sidewall 128, and the continuous surface faces away from the light-guide substrate 110 of the optical device 100. In some embodiments, the grating coupler 120 includes a step grating structure, a blazed grating structure, or a slanted grating structure. It should be understood that the grating coupler 120 shown in FIG. 1B is merely a schematic diagram, and the detailed structure of the grating coupler 120 will be described in FIG. 15A to FIG. 15F below. Besides, the grating coupler 120 could be mirror structures in a lateral symmetry of FIG. 15A to FIG. 15F.

Please refer to FIG. 2A, FIG. 2B, FIG. 3A, and FIG. 4A. Each of the optical devices 100a1, 100a2, 100b, 100c further includes a grating layer 210 compared to the optical device 100 of FIG. 1A.

Please refer to FIG. 2A. In the optical device 100a1, the grating layer 210 extends along a surface 112 of the light-guide substrate 110, and the grating coupler 120 is disposed on the grating layer 210. The grating layer 210 has a portion between the grating coupler 120 and the light-guide substrate 110. In other words, the grating layer 210 is higher than the light-guide substrate 110 and lower than the grating coupler 120. In some embodiments, the grating layer 210 has a high refractive index (n). The refractive index of the grating layer 210 is in a range from 1.7 to 3.0 during the visible light wavelengths (400-700 nm). In some embodiments, the refractive index of the grating layer 210 can be the same as the refractive index of the light-guide substrate 110. In some embodiments, a material of the grating layer 210 includes $Al_2O_3$, $Nb_2O_5$, $Ta_2O_5$, $TiO_2$, $SiN_4$, or other suitable materials. An enlargement view of the grating coupler 120 in FIG. 2A can refer to FIG. 1B.

Please refer to FIG. 2B. In the optical device 100a2, the grating layer 210 extends along a surface 112 of the light-guide substrate 110, and the grating coupler 120 is disposed in the grating layer 210. Specifically, the grating coupler 120 of FIG. 2B can be formed by etching the grating layer 210. An enlargement view of the grating coupler 120 in FIG. 2B can refer to FIG. 1B.

Figure 3B:
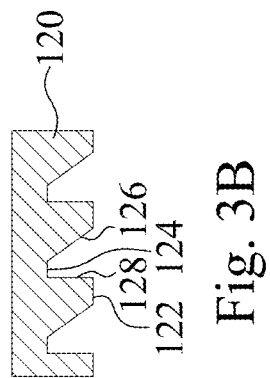
Figure 3A:
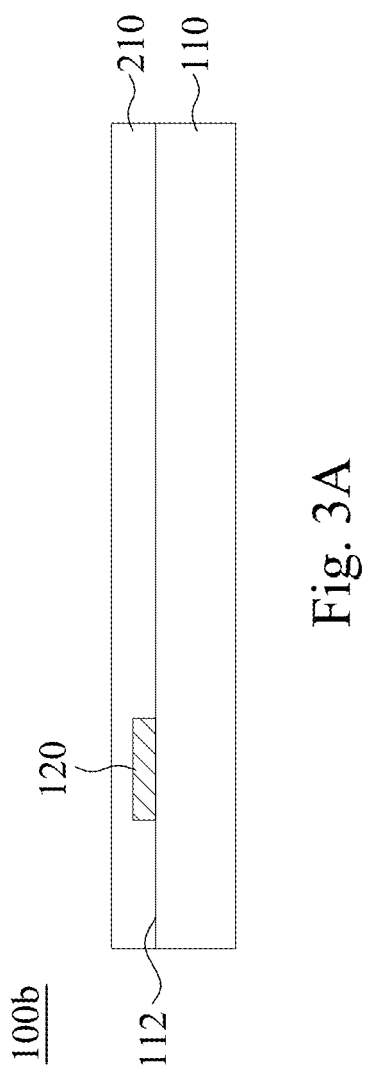

Please refer to FIG. 3A. In the optical device 100b, the grating layer 210 extends along the surface 112 of the light-guide substrate 110, and the grating coupler 120 is disposed in the grating layer 210. Please refer to FIG. 3B, and FIG. 3B illustrates an enlargement view of the grating coupler 120 in FIG. 3A. The continuous surface (the top surface 122, the sidewall 126, the bottom surface 124, and the sidewall 128) of the grating coupler 120 faces toward the light-guide substrate 110 of the optical device 100b.

Figure 4B:
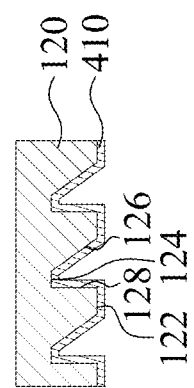
Figure 4A:
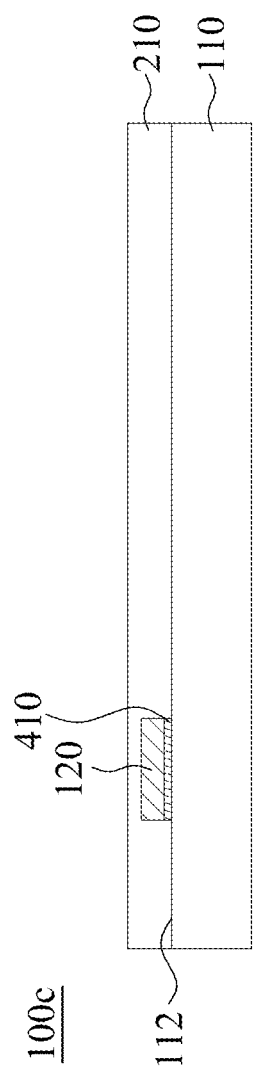

Please refer to FIG. 4A. The optical device 100c further includes a metal layer 410 compared to the optical device 100b of FIG. 3A. In the optical device 100c, the grating layer 210 extends along the surface 112 of the light-guide substrate 110. The grating coupler 120 and the metal layer 410 are disposed in the grating layer 210, in which the metal layer 410 is disposed between the grating coupler 120 and the light-guide substrate 110. In some embodiments, the metal layer 410 can be made of Au, Al, Ti, Ni, Nb, and W. Please refer to FIG. 4B, and FIG. 4B illustrates an enlargement view of the grating coupler 120 in FIG. 4A. The continuous surface (the top surface 122, the sidewall 126, the bottom surface 124, and the sidewall 128) of the grating coupler 120 faces toward the light-guide substrate 110, and the metal layer 410 is disposed on the continuous surface of the grating coupler 120. It is noticed that the main differences between FIG. 1A, FIG. 2A, FIG. 2B, FIG. 3A, and FIG. 4A are associated with various positions of the grating coupler 120.

Figure 5:
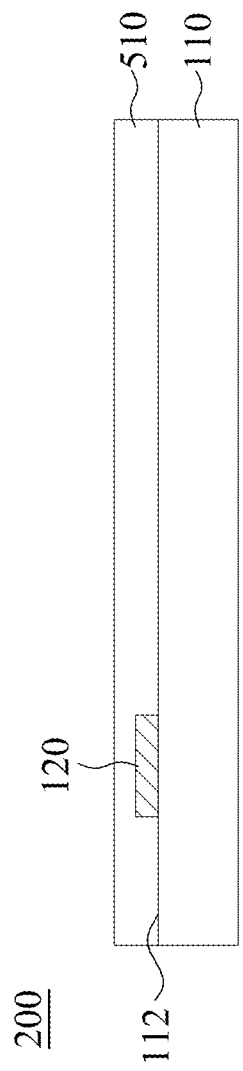

Please refer to FIG. 5. An optical device 200 further includes a cladding layer 510 compared to the optical device 100 of FIG. 1A. The optical device 200 includes the compared light-guide substrate 110, the grating coupler 120, and the cladding layer 510. The cladding layer 510 covers the grating coupler 120 and the light-guide substrate 110. Specifically, the cladding layer 510 extends along the surface 112 of the light-guide substrate 110, and the grating coupler 120 is disposed in the cladding layer 510. In some embodiments, the refractive index of the light-guide substrate 110 is greater than a refractive index of the cladding layer 510. In some embodiments, the refractive index of the cladding layer 510 is less than 1.6, such as 1.5, 1.4, 1.3, 1.2, or 1.1. In some embodiments, the refractive index of the grating coupler 120 is greater than the refractive index of the cladding layer 510. In some embodiments, the refractive index of the grating coupler 120 is in a range from 1.7 to 2.9, such as 2.0, 2.2, or 2.35. In some embodiments, the cladding layer 510 can be made of $SiO_2$, spin-on glass (SOG), polymer, or other suitable materials. In some embodiments, a thickness of the cladding layer 510 is in a range from 100 nm to 1 mm, such as 300 nm, 500 nm, or 2 um. An enlargement view of the grating coupler 120 in FIG. 5 can refer to FIG. 1B. It is to be noticed that the difference between the optical device 100 in FIG. 1A and the optical device 200 in FIG. 5 is the cladding layer 510.

Figure 6:
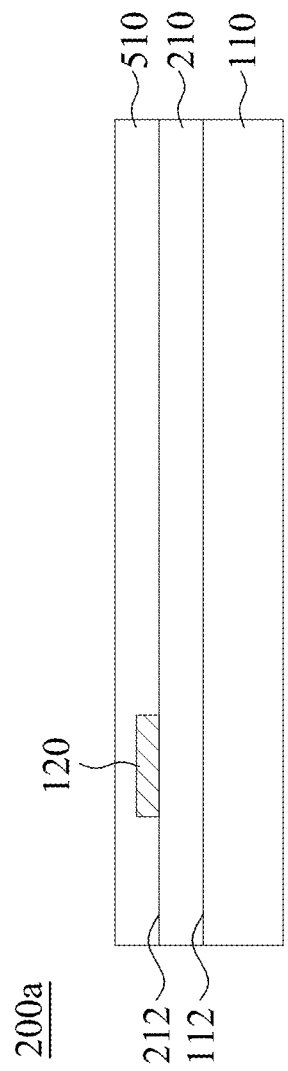
Figure 7:
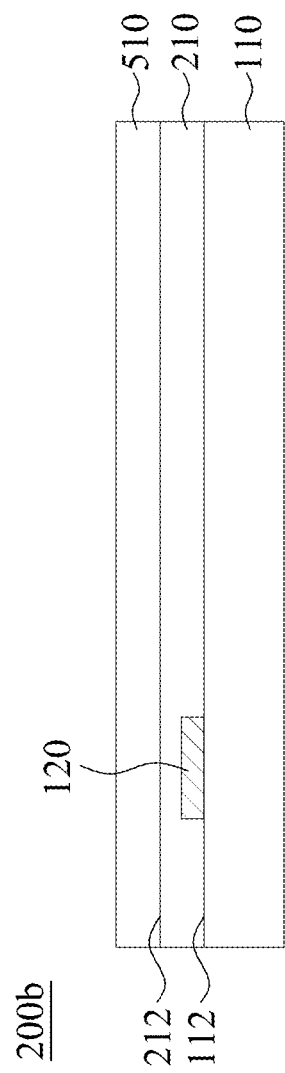
Figure 8:
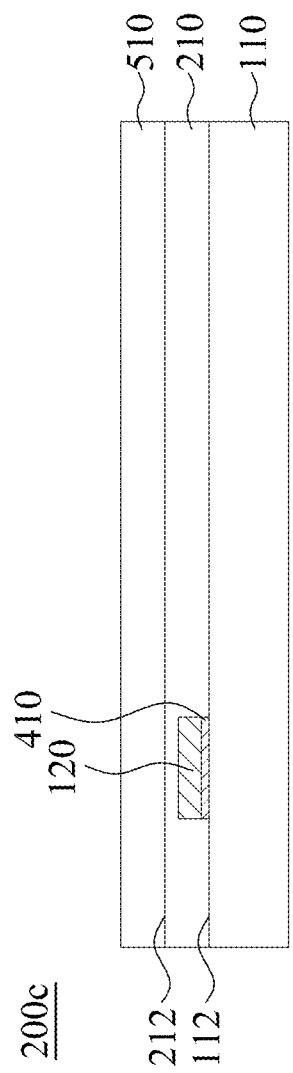

Please refer to FIG. 6, FIG. 7, and FIG. 8. Optical devices 200a, 200b, 200c further include the grating layer 210 compared to the optical device 200 of FIG. 5.

Please refer to FIG. 6. In the optical device 200a, the grating layer 210 extends along the surface 112 of the light-guide substrate 110, and the cladding layer 510 extends along a surface 212 of the grating layer 210. The grating layer 210 is disposed between the light-guide substrate 110 and the cladding layer 510, and the grating coupler 120 is on the surface 212 of the grating layer 210. Specifically, the grating coupler 120 is disposed in the cladding layer 510. An enlargement view of the grating coupler 120 in FIG. 6 can refer to FIG. 1B.

Please refer to FIG. 7. In the optical device 200b, the grating layer 210 extends along the surface 112 of the light-guide substrate 110, and the cladding layer 510 extends along the surface 212 of the grating layer 210. The grating coupler 120 is disposed on the light-guide substrate 110. Specifically, the grating coupler 120 is disposed in the grating layer 210. An enlargement view of the grating coupler 120 in FIG. 7 can refer to FIG. 3B.

Please refer to FIG. 8. The optical device 200c further includes the metal layer 410 compared to the optical device 200b of FIG. 7. The metal layer 410 is disposed between the grating coupler 120 and the light-guide substrate 110. An enlargement view of the grating coupler 120 in FIG. 8 can refer to FIG. 4B. It is noticed that the main differences between FIG. 5, FIG. 6, FIG. 7, and FIG. 8 are associated with various positions of the grating coupler 120.

In the following disclosure, reference numerals are repeated herein to show the same or similar features, and the description above applies equally to the embodiments described below, and the details thereof are not repeatedly described.

Figure 9:
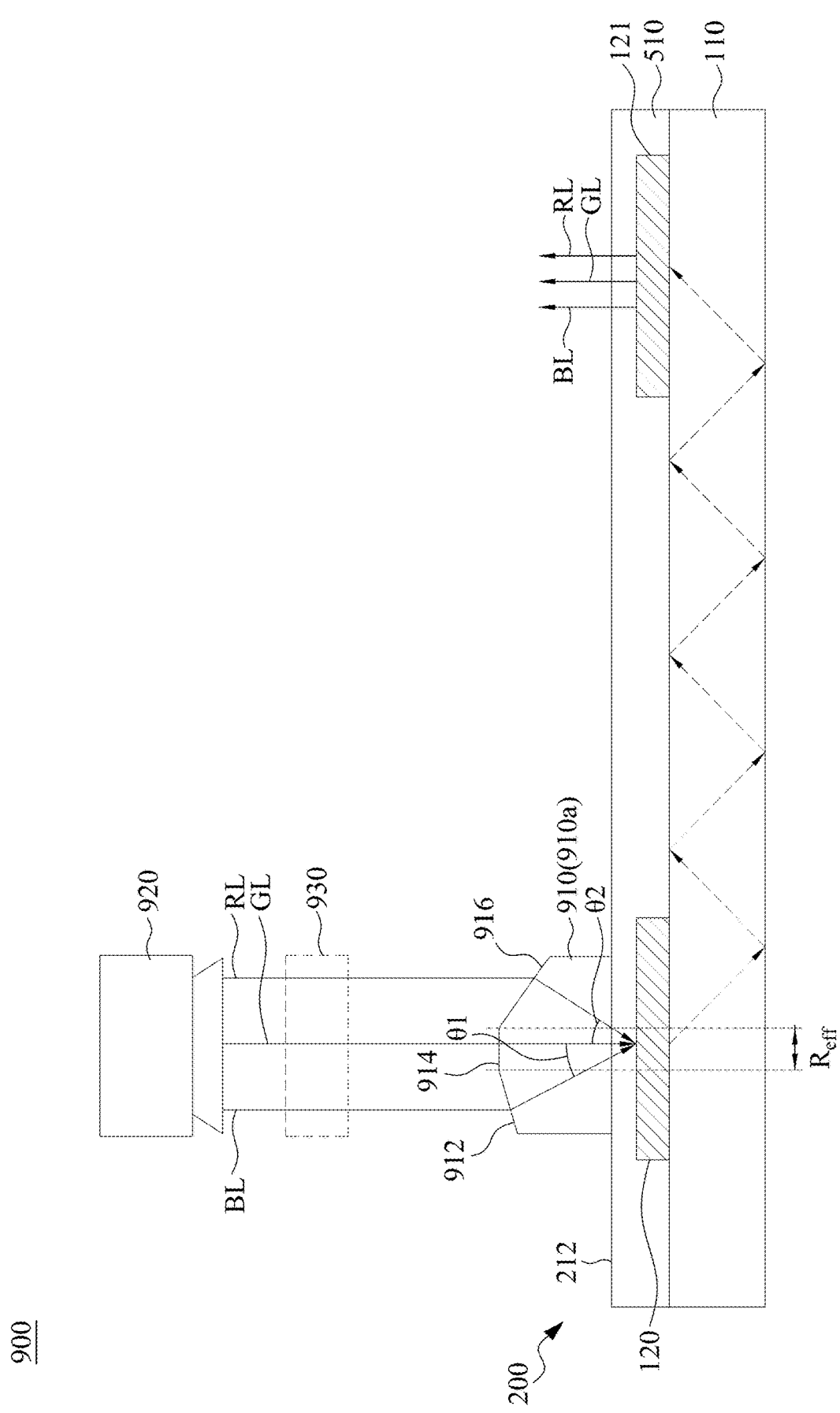
FIG. 9, FIG. 11, FIG. 12, FIG. 13, and FIG. 14 are schematic views of optical systems in accordance with some embodiments of the present disclosure.

Please refer to FIG. 9. FIG. 9 is a schematic view of an optical system 900 in accordance with some embodiments of the present disclosure. The optical system 900 includes the optical device 200, an optical element 910, a light module and a grating coupler 121. The optical device 200 can be replaced by any one of the aforementioned optical devices 200a, 200b, 200c. In some embodiments, the optical element 910 is a prism 910a, as shown in FIG. 9. The cladding layer 510 covers the grating coupler 120, the grating coupler 121, and the light-guide substrate 110. The optical element 910 is below the light module and is configured to change incident angles of the three beams (e.g., the blue light BL, the green light GL, and the red light RL at left side of FIG. 9) and to focus the three beams at the same region of the grating coupler 120. The grating coupler 120 is below the optical element 910 and is configured to couple the three beams into the light-guide substrate 110. The light-guide substrate 110 is connected to the grating coupler 120 and is configured to transmit the three beams. The grating coupler 121 is connected to the light-guide substrate 110 and is configured to enable the three beams departing from the light-guide substrate 110 after the three beams have traveled the same optical path. The light module emits three beams from different positions and includes a projector 920. The three beams include three separated RGB images, and each of the three RGB images is a collimating light.

Still refer to FIG. 9. The optical element 910 is disposed above the grating coupler 120 and is configured to change incident angles of three RGB lights entering the grating coupler 120. Specifically, the prism 910a is disposed on the surface 212 of the cladding layer 510. The prism 910a has three top surfaces 912, 914, 916 configured to change optical paths of the three RGB lights from the projector 920. The three RGB lights are a red light RL, a green light GL, and a blue light BL. Each of the three RGB lights has a collimating light with an image dimension of 0.1 mm to 10 mm, such as 0.5 mm, 1 mm, 2 mm, 3 mm, and 5 mm, and has an incident position (such as the top surfaces 912, 914, 916) on the optical element 910 before entering the optical element 910, and the incident positions of the three RGB lights are different from each other. The optical element 910 is configured to enable the three RGB lights to focus on the same region of the grating coupler 120 when the three RGB lights pass through the optical element 910 and the cladding layer 510. The three RGB lights transmit in the light-guide substrate 110 after entering the grating coupler 120, and each of the three RGB lights has the same optical path. The three RGB lights transmit out at the same region of the grating coupler 121.

In some embodiments, a wavelength of the red light RL is 620~680 nm (such as 633 nm), a wavelength of the green light GL is 520~570 nm (such as 532 nm), and a wavelength of the blue light BL is 440~491 nm (such as 488 nm). The projector 920 is disposed above the optical element 910, and the projector 920 is configured to provide the three RGB lights. In some embodiments, the projector 920 is configured to provide the collimating lights of an overlapped RGB colored image. In other embodiments, the projector 920 is configured to provide the three RGB lights, and the RGB lights can be decoupled in three separated frames. The grating coupler 121 is disposed on the light-guide substrate 110. The grating coupler 121 can be the same or similar to the grating coupler 120. In some embodiments, the optical system 900 may be applied in augmented reality (AR). The detailed structure of the grating coupler 120 will be described in FIG. 15A to FIG. 15F below. The transmission and image of three RGB lights will be described below.

Figure 10A:
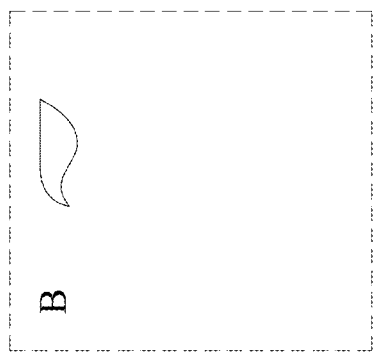
FIG. 10A, FIG. 10B, and FIG. 10C are schematic views of original images of the three separated collimating RGB lights.
Figure 10B:
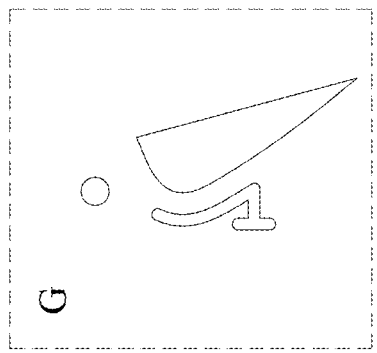
Figure 10C:
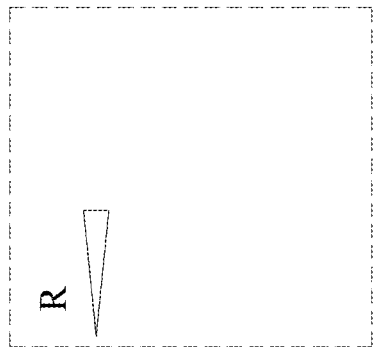
Figure 10D:
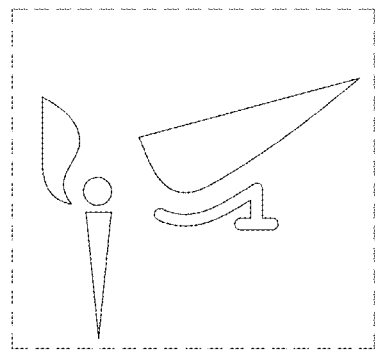
FIG. 10D is a schematic view of an optical image of the overlapped colored image.

FIG. 10A, FIG. 10B, and FIG. 10C are schematic views of original images of the three separated collimating RGB lights, and FIG. 10D is a schematic view of an optical image of the overlapped colored image. Please refer to an area 930 in FIG. 9 and FIGS. 10A-10C. The area 930 illustrates the transmission of the three RGB lights emitting from the projector 920. The blue light BL transmits the image shown in FIG. 10A, the green light GL transmits the image shown in FIG. 10B, and the red light RL transmits the image shown in FIG. 10C. Specifically, the image in FIG. 10A is a blue color, the image in FIG. 10B is a green color, and the image in FIG. 10C is a red color. Next, the blue light BL, the green light GL, and the red light RL would change their travel directions when entering the prism 910a. Then, the blue light BL, the green light GL, and the red light RL would converge at the continuous surface of the grating coupler 120. It is noticed that incident angles of the blue light BL, the green light GL, and the red light RL are changed at the continuous surface of the grating coupler 120, and then couple into the light-guide substrate 110 through the grating coupler 120. Therefore, the optical paths of the blue light BL, the green light GL, and the red light RL in the light-guide substrate 110 become the same. After the blue light BL, the green light GL, and the red light RL enter the light-guide substrate 110, the three RGB lights reflect and transmit in the light-guide substrate 110. Finally, the three RGB lights couple out through the grating coupler 121, and then the image shown in FIG. 10D may be observed by a viewer, in which the image in FIG. 10D has blue, green, and red colors. In other words, FIG. 10D is a combination of FIG. 10A, FIG. 10B, and FIG. 10C.

Please refer to FIG. 9 again. The grating coupler 120 has an effective coupling region $R_{eff}$ in a range from 1 mm to 15 mm, such as 2, 3, 4, 5, 6, 7, 8, 9, 10, 11, 12, 13, or 14 mm. The effective coupling region $R_{eff}$ is a region where RGB lights are overlapped and coupled into the light-guide substrate 110. As for the three RGB lights, the travel directions of RGB lights in the prism 910a are different. The three RGB lights have different incident angles at the continuous surface of the grating coupler 120. In some embodiments, an incident angle θ1 of the blue light BL is 3.1 degrees, 4.4 degrees, 5.9 degrees, or 6.3 degrees. In some embodiments, an incident angle of the green light GL is 0 degree (that is, an incident direction is a normal direction of the surface of the grating coupler 120). In some embodiments, the green light GL has an incident angle θ2, and the incident angle θ2 is −2.8 degrees. In some embodiments, an incident angle θ2 of the red light RL is −9.9 degrees, −13.7 degrees, −14.6 degrees, or −16.5 degrees. It is understood that the incident angles of the three RGB lights can be adjusted depending on the requirement of the optical system 900, and each of the incident angles of the three RGB lights can be referred to as a wavelength of a color. In some embodiments, a material of the prism 910a is the same as a material of the cladding layer 510.

Figure 11:
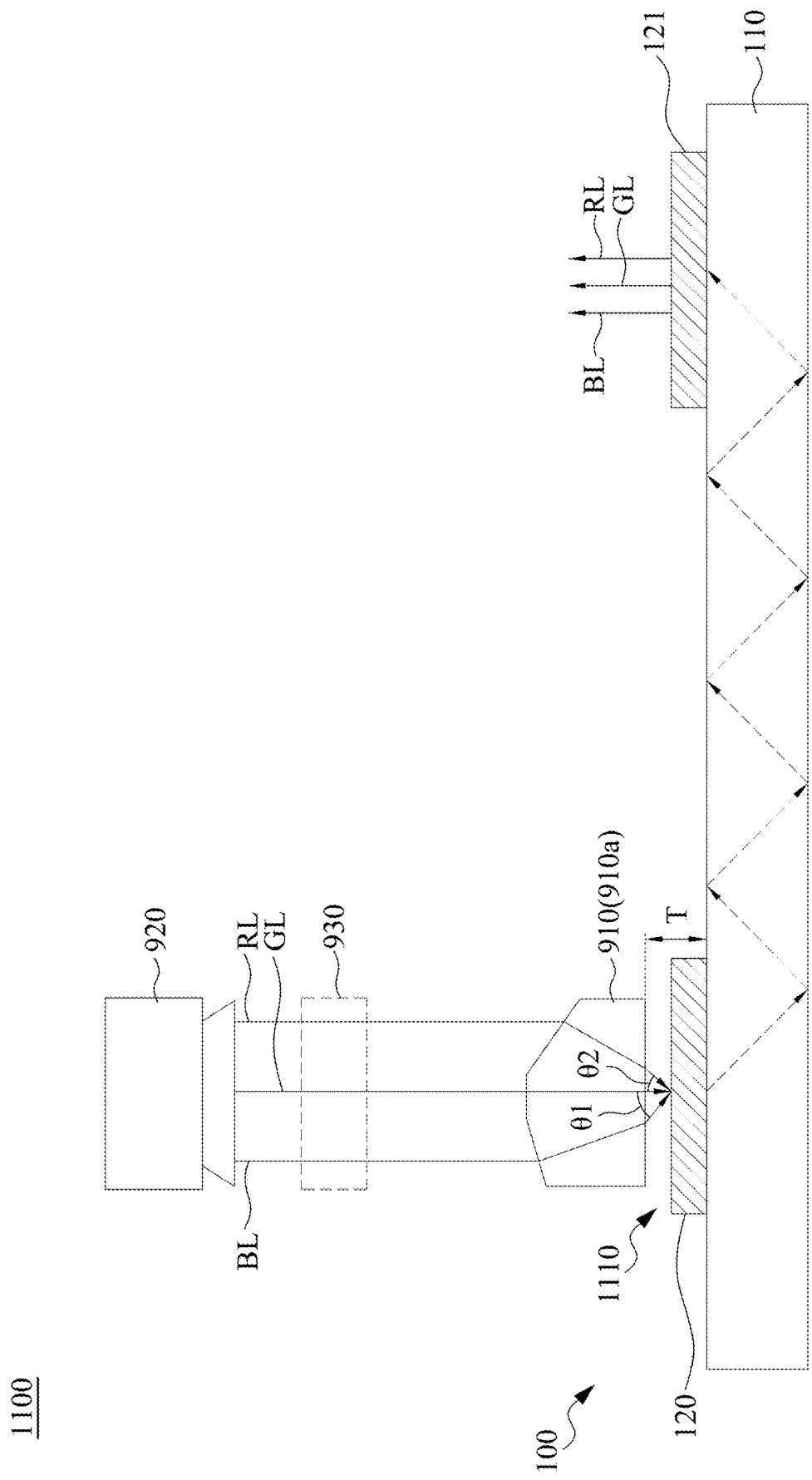

Please refer to FIG. 11. FIG. 11 is a schematic view of an optical system 1100 in accordance with some embodiments of the present disclosure. The optical system 1100 includes the optical device 100, the optical element 910, the projector 920, and the grating coupler 121. The difference between the optical system 900 in FIG. 9 and the optical system 1100 in FIG. 11 is that the cladding layer 510 in the optical system 900 is replaced by the air gap 1110 in the optical system 1100. A refractive index of the air gap 1110 is 1. In addition, the optical device 200 in the optical system 900 is replaced by the optical device 100 in the optical system 1100. In the optical system 1100, the optical device 100 can be replaced by any one of the aforementioned optical devices 100a1, 100a2, 100b, 100c. In some embodiments, a thickness T of the air gap 1110 is in a range from 0.1 mm to 100 mm, such as 0.5, 0.8, 1, 2, 3, 5, 8, 15, 30, 50 or 80 mm.

Figure 12:
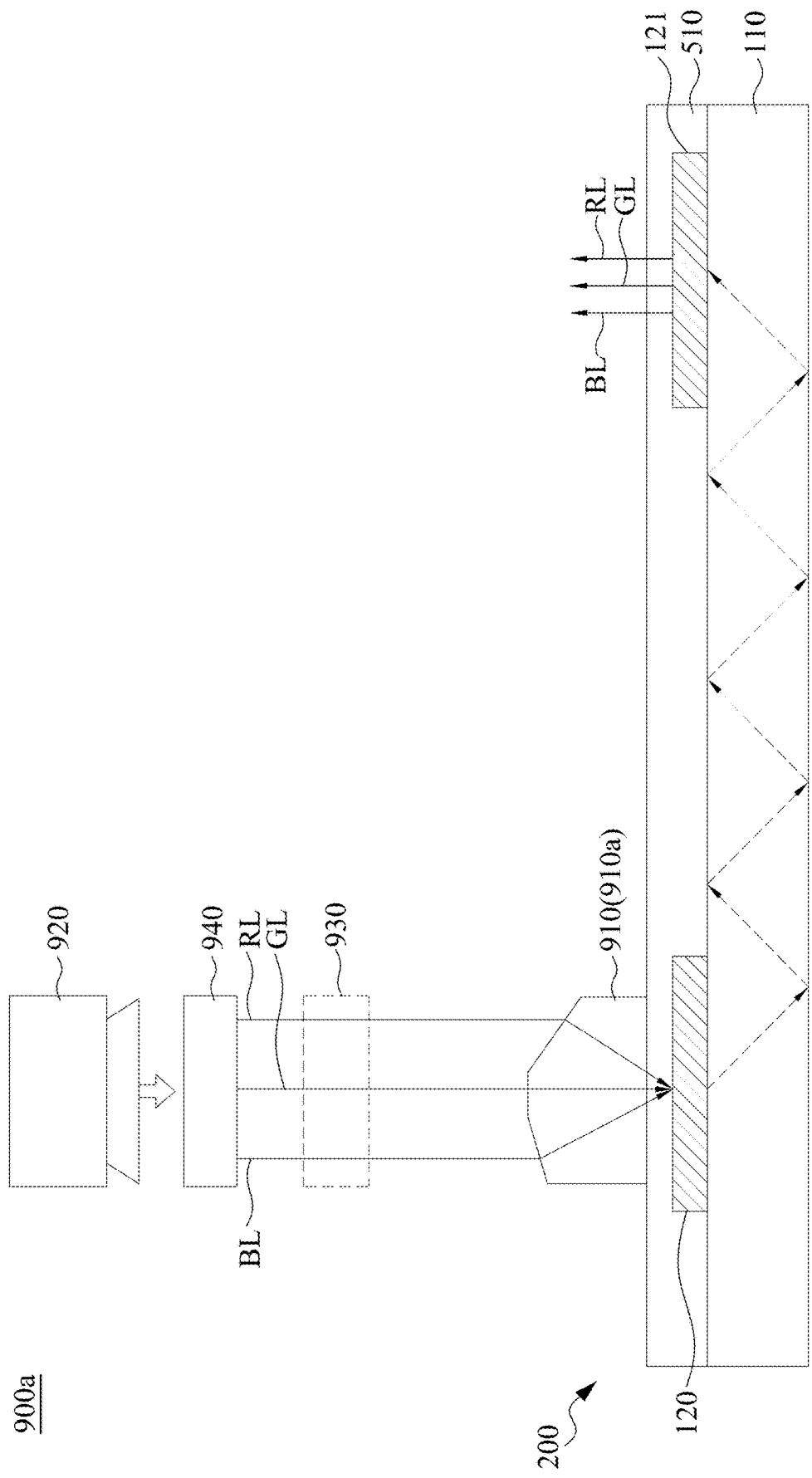

Please refer to FIG. 12. FIG. 12 is a schematic view of an optical system 900a in accordance with some embodiments of the present disclosure. The optical system 900a further includes a splitter 940 compared to the optical system 900 in FIG. 9. The splitter 940 is disposed between the optical element 910 and the projector 920. In some embodiments, the projector 920 is configured to provide a collimating light, and the splitter 940 is configured to convert the overlapped collimating colored light or image into the three separated RGB lights or images. In some embodiments, the splitter 940 is a dove prism. In some embodiments, the splitter 940 and the prism 910a can be integrated to form another optical component.

Figure 13:
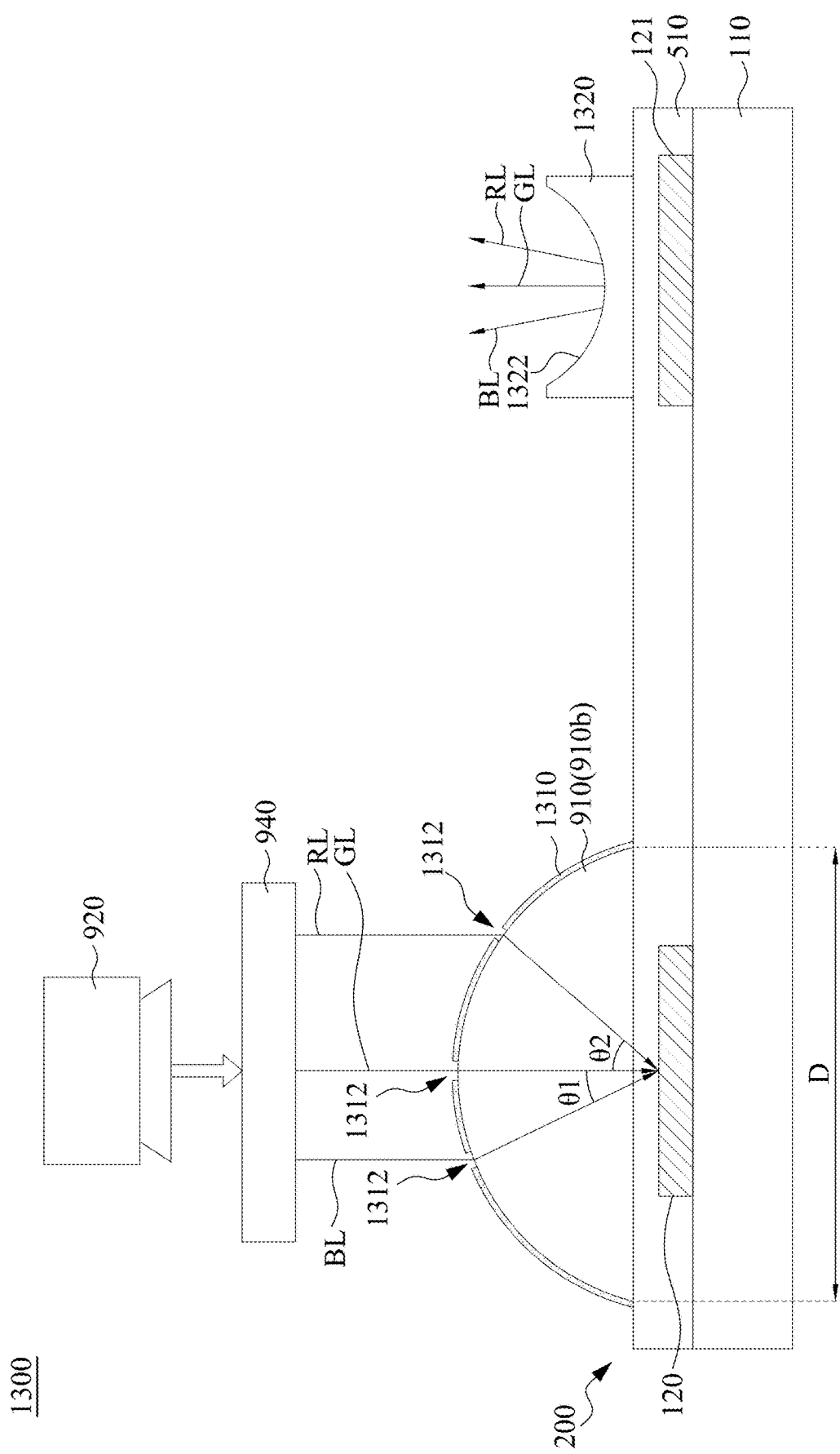

Please refer to FIG. 13. FIG. 13 is a schematic view of an optical system 1300 in accordance with some embodiments of the present disclosure. The optical system 1300 includes the optical device 200, the optical element 910, a metal shielding 1310, and an optical element 1320. In some embodiments, the optical element 910 is a microlens 910b, as shown in FIG. 13. In some embodiments, a diameter D of the optical element 910 is in a range from 1 mm to 100 mm, such as 10, 20, 30, 50, 70, or 90 mm. The metal shielding 1310 is disposed on the microlens 910b. The metal shielding 1310 has three openings 1312 configured to respectively allow the three RGB lights to enter the microlens 910b and configured to change travel directions of the three RGB lights from the projector 920 and/or the splitter 940. In some embodiments, a refractive index of the microlens 910b is the same as or similar to the refractive index of the cladding layer 510. In some embodiments, the refractive index of the microlens 910b is less than 1.6, such as 1.5, 1.4, 1.3, 1.2, or 1.1. In some embodiments, a material of the microlens 910b is the same as a material of the cladding layer 510, such as $SiO_2$ or polymer. In some embodiments, the metal shielding 1310 can be made of Ti, Nb, Al, or W. In addition to incident angle adjustment and convergence of the three RGB images, the microlens 910b also shrinks the sizes of the images. Thus, the optical element 1320 has a concave surface 1322 and is configured to enlarge the images of the RGB lights coupled out from the grating coupler 121. In some embodiments, the splitter 940, the microlens 910b, and the metal shielding 1310 can be integrated to form another optical component.

The difference between the optical system 900 in FIG. 9 and the optical system 1300 in FIG. 13 is that the optical element 910 and the light source emitting the overlapped color image with RGB lights. Specifically, the prism 910a in the optical system 900 is replaced by the microlens 910b and the metal shielding 1310 in the optical system 1300. As for the light source emitting the overlapped color image with RGB lights, it is not limited to the projector 920 or the assembly of the projector 920 and the splitter 940.

Figure 14:
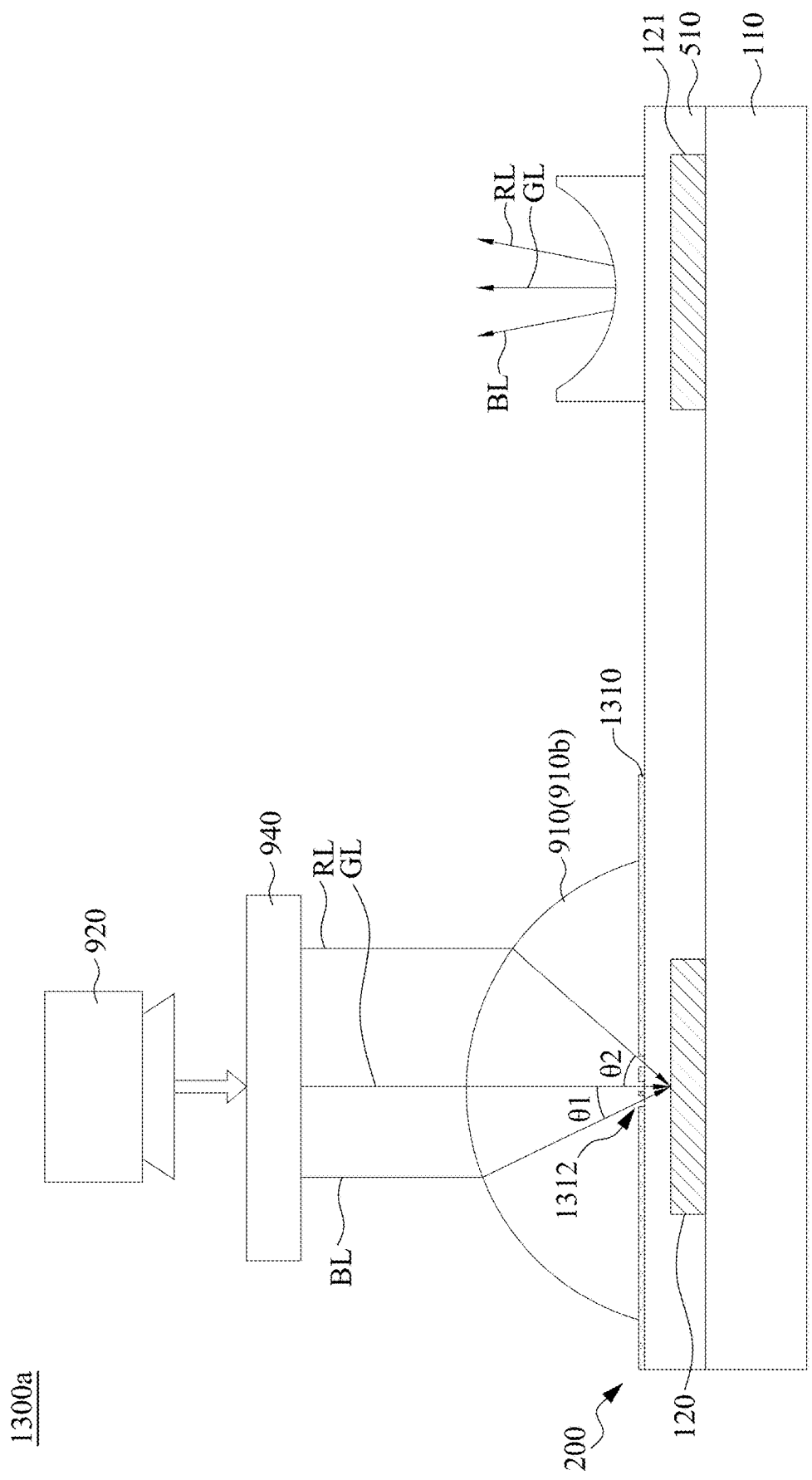

Please refer to FIG. 14. FIG. 14 is a schematic view of an optical system 1300a in accordance with some embodiments of the present disclosure. The metal shielding 1310 is disposed between the microlens 910b and the cladding layer 510. The metal shielding 1310 has three openings 1312 configured to respectively allow the three separated RGB lights to enter the grating coupler 120 and configured to change travel directions of the three separated RGB lights from the projector 920 and/or the splitter 940. Other elements and configurations in the optical system 1300a are the same as those in the optical system 1300 of FIG. 13.

Please refer to FIG. 15A to FIG. 15F. FIG. 15A to FIG. 15F are cross-sectional views of various grating structures of the grating coupler 120 (see FIG. 1B) in accordance with some embodiments of the present disclosure. The grating coupler 120 includes at least one of a step grating structure 120a, a blazed grating structure 120b, and slanted grating structures 120c-120f. Please refer to the enlargement view of grating coupler 120 in FIG. 1B again. The grating coupler 120 has the grating period p and the height h. The grating structures 120a-120f in FIG. 15A to FIG. 15F can be selectively used in the grating coupler 120 of FIG. 1B. Besides, the grating coupler 120 could be mirror structures in a lateral symmetry of FIG. 15A to FIG. 15F depending on the $1^{st}$ diffraction light efficiency and the requested light propagation direction.

Figure 15A:
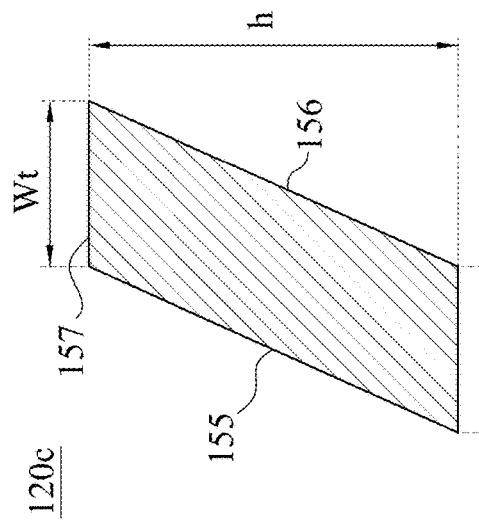
FIG. 15A, FIG. 15B, FIG. 15C, FIG. 15D, FIG. 15E, and FIG. 15F are cross-sectional views of various grating structures of the grating coupler in accordance with some embodiments of the present disclosure.

FIG. 15A illustrates the step grating structure 120a of the grating coupler 120. In some embodiments, the step grating structure 120a has n steps, in which n is in a range from 3 to 32. For example, n is 4, 6, 8, 10, 12, 14, 16, 18, 20, 22, 24, 26, 28, 30. Specifically, FIG. 15A illustrates a 3-step grating structure. The step grating structure 120a includes a first vertical sidewall 151, a second vertical sidewall 152, and a horizontal surface 153. The horizontal surface 153 adjoins the first vertical sidewall 151 and the second vertical sidewall 152. In some embodiments, a top width Wt of the step grating structure 120a is 80 nm, a bottom width Wb of the step grating structure 120a is 300 nm, the height h of the step grating structure 120a is 400 nm, the first vertical sidewall 151 of the step grating structure 120a has a 200 nm height, the second vertical sidewall 152 of the step grating structure 120a has a 200 nm height, and the horizontal surface 153 of the step grating structure 120a has a 220 nm width.

Figure 15D:
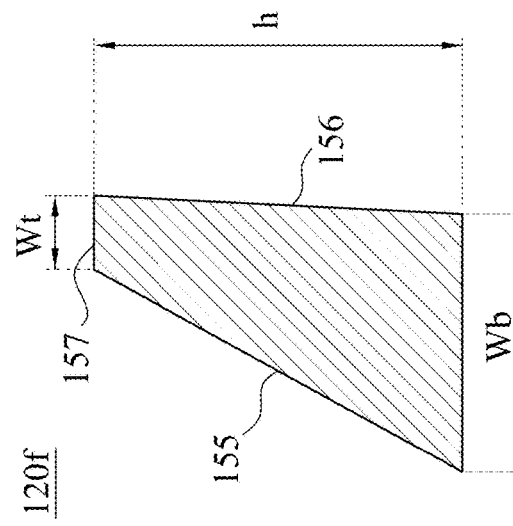
Figure 15B:
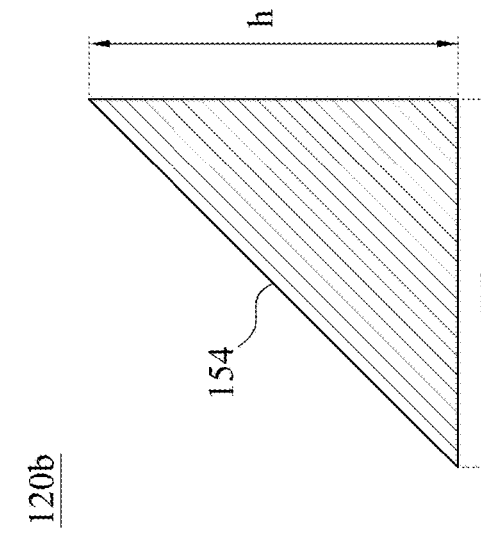

FIG. 15B illustrates the blazed grating structure 120b of the grating coupler 120. The blazed grating structure 120b includes an oblique sidewall 154. The oblique sidewall 154 extends from a top of the blazed grating structure 120b to a bottom of the blazed grating structure 120b, and a width of the blazed grating structure 120b gradually increases from the top of the blazed grating structure to the bottom of the blazed grating structure 120b. In some embodiments, the bottom width Wb of the blazed grating structure 120b is 400 nm and the height h of the blazed grating structure 120b is 400 nm.

FIG. 15C to FIG. 15F illustrate the slanted grating structures 120c-120f of the grating coupler 120. Each of the slanted grating structures 120c-120f includes a first oblique sidewall 155, a second oblique sidewall 156, and a top surface 157. The top surface 157 adjoins the first oblique sidewall 155 and the second oblique sidewall 156. Each of the first oblique sidewalls 155 of the slanted grating structures 120c-120f has a first slope and each of the second oblique sidewalls 156 of the slanted grating structures 120c-120f has a second slope. In some embodiments, the first slope is the same as the second slope. In some embodiments, the first slope is less than the second slope.

Figure 15E:
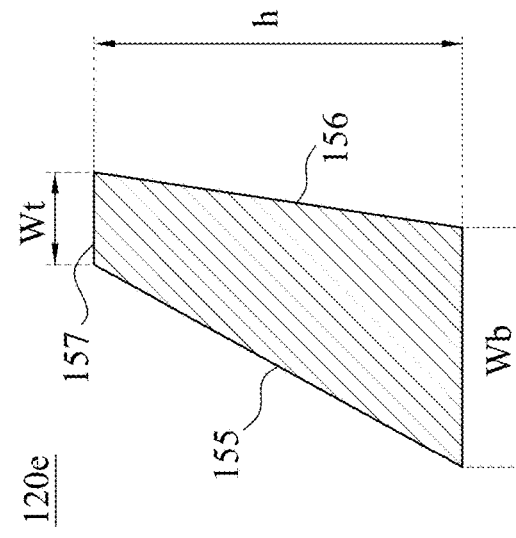
Figure 15C:
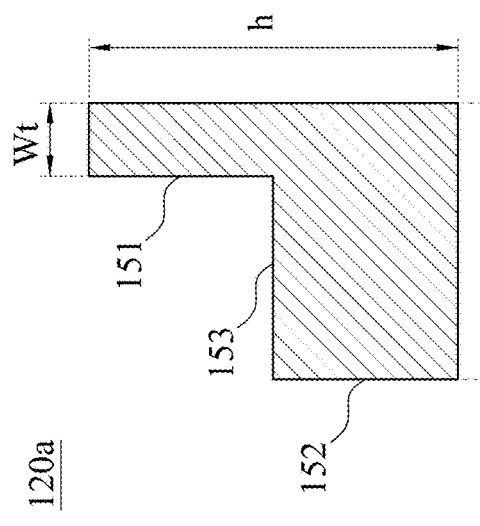
Figure 15F:
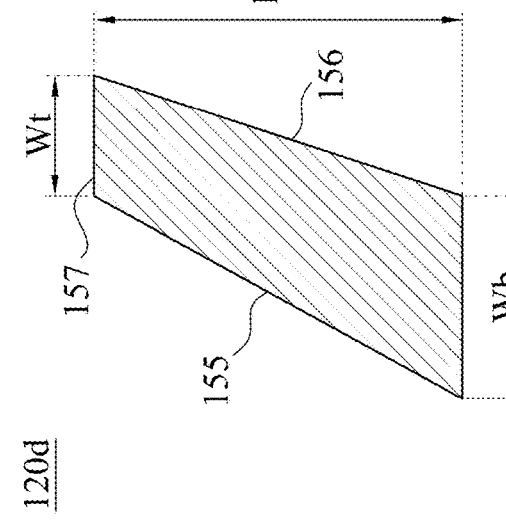

In some embodiments, the bottom width Wb is 180 nm, the top width Wt is 180 nm, and the height h is 400 nm, as shown in FIG. 15C. In some embodiments, the bottom width Wb is 228 nm, the top width Wt is 136 nm, and the height h is 400 nm, as shown in FIG. 15D. In some embodiments, the bottom width Wb is 260 nm, the top width Wt is 100 nm, and the height h is 400 nm, as shown in FIG. 15E. In some embodiments, the bottom width Wb is 280 nm, the top width Wt is 80 nm, and the height h is 400 nm, as shown in FIG. 15F. It should be understood that the various dimensions of the grating coupler 120 would be changed depending on the designs of optical systems (such as the optical systems 900, 900a, 1100, 1300, or 1300a). The various dimensions of the grating coupler 120 would also be changed depending on the wavelengths of the RGB lights and the incident angles of the RGB lights. In some embodiments, the grating period p of the grating coupler 120 is in a range from 300 nm to 500 nm. In some embodiments, the height h of the grating coupler 120 is in a range from 100 nm to 600 nm.

FIG. 16A, FIG. 16B, FIG. 17A, FIG. 17B, FIG. 18A, FIG. 18B, FIG. 19A, and FIG. 19B are incident angle-intensity charts for a green light GL having 532 nm wavelength under different grating structures in accordance with some embodiments of the present disclosure. Specifically, the step grating structure 120a, the blazed grating structure 120b, and the slanted grating structure 120c-120f are used in the simulation. More specifically, the grating period p is 400 nm and the height h is 400 nm (please refer to FIG. 1B). The simulation results show the relationships between intensities of different grating couplers 120 and the incident angles of the green light GL under different refractive index of the grating coupler 120 and different refractive index of the cladding layer 510. It should be understood that the "intensity" herein represents a coupling efficiency of the grating coupler 120, and the "incident angle" herein represents the angle relative to the normal direction of the surface of the grating coupler 120. In addition, the "full width at half maximum (FWHM)" herein can be understood as a field of view (FOV). In some embodiments, Rigorous Coupled Wave Analysis (RCWA) method is used.

Figure 16A:
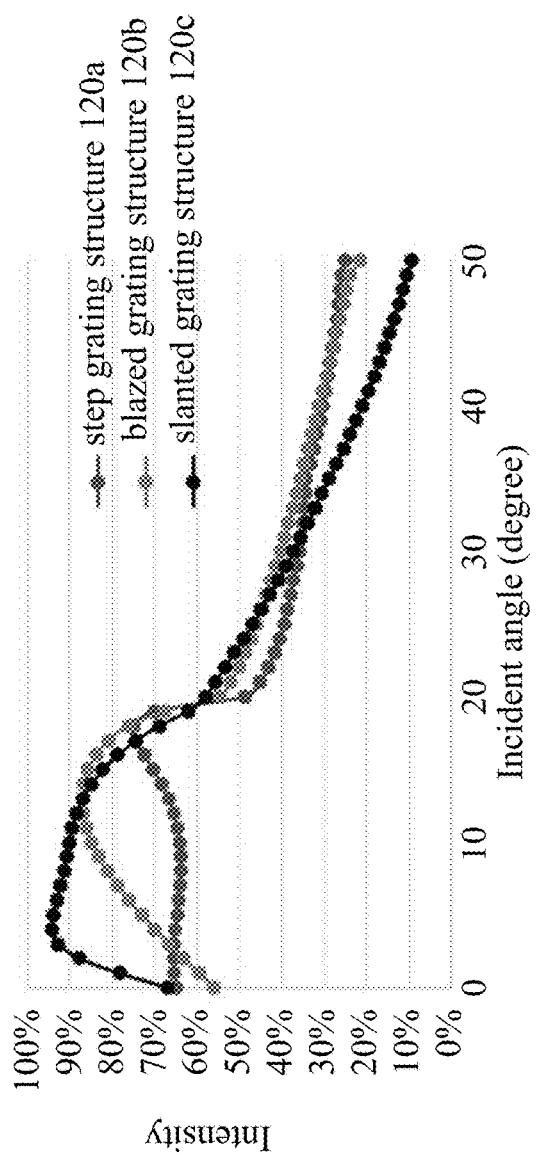
FIG. 16A, FIG. 16B, FIG. 17A, FIG. 17B, FIG. 18A, FIG. 18B, FIG. 19A, and FIG. 19B are incident angle-intensity charts for a green light having 532 nm wavelength under different grating structures in accordance with some embodiments of the present disclosure.
Figure 16B:
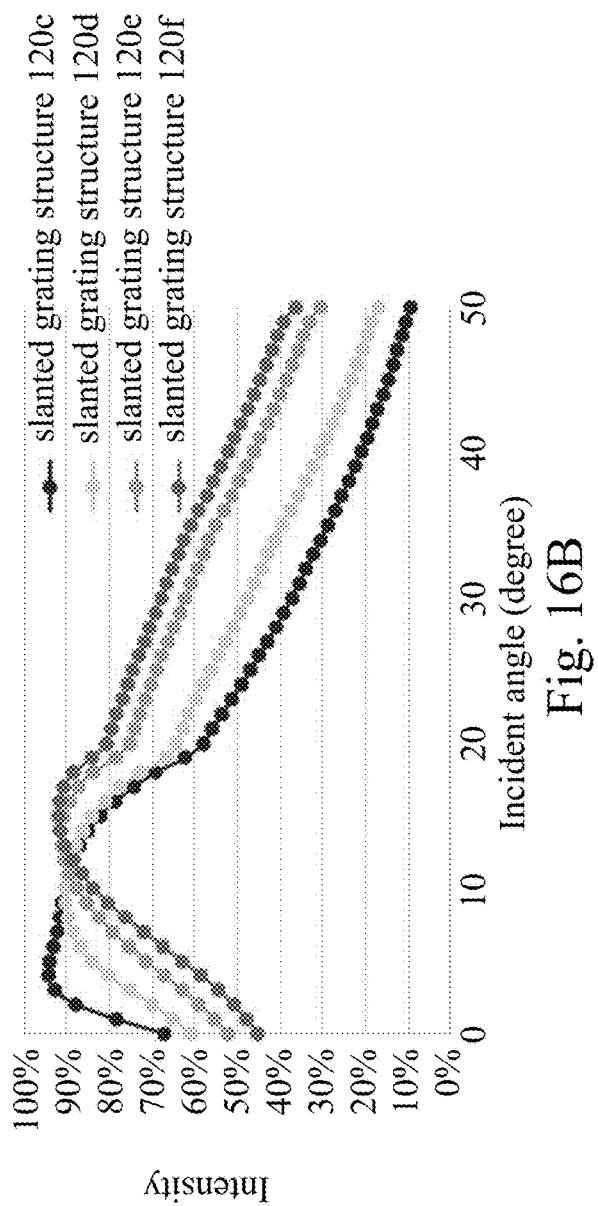

Please refer to FIG. 16A and FIG. 16B. In the simulation results of FIG. 16A and FIG. 16B, the refractive index of the grating coupler 120 is 1.9 and the refractive index of the cladding layer 510 is 1. In other words, the cladding layer 510 is the air gap 1110 (see FIG. 11). In FIG. 16A, the step grating structure 120a, the blazed grating structure 120b, and the slanted grating structure 120c have high intensities when the incident angle is less than around 20 degrees. In FIG. 16B, the slanted grating structure 120c, the slanted grating structure 120d, the slanted grating structure 120e, and the slanted grating structure 120f have high intensities when the incident angle is less than around 40 degrees.

Figure 17A:
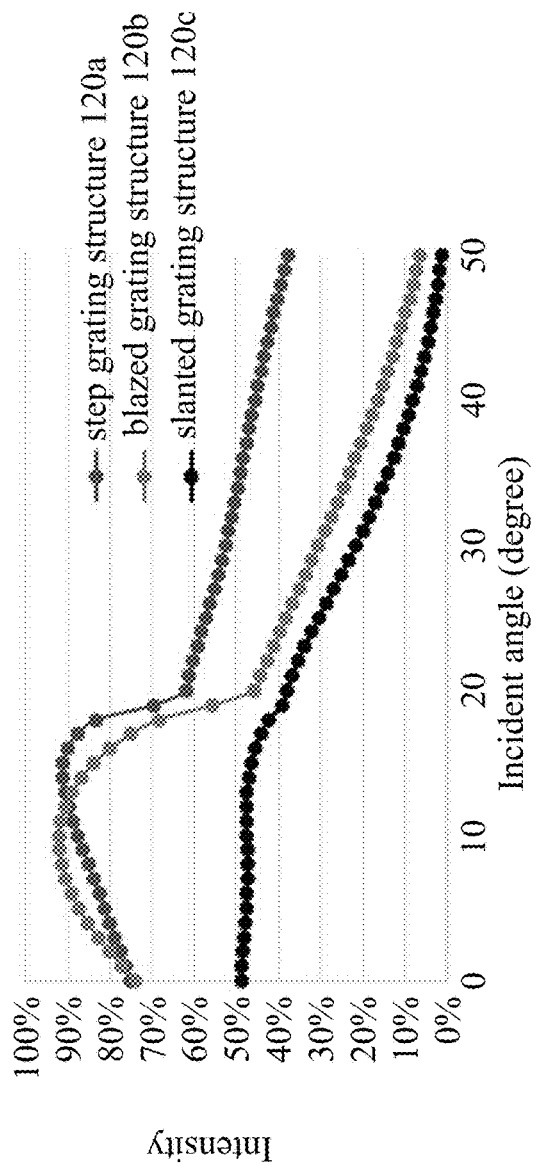
Figure 17B:
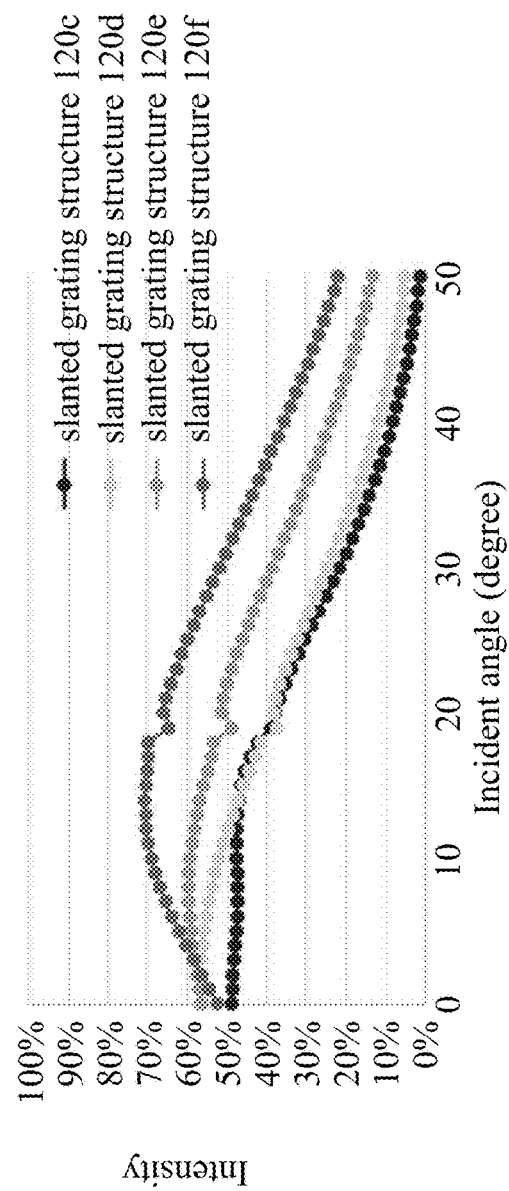

Please refer to FIG. 17A and FIG. 17B. In the simulation results of FIG. 17A and FIG. 17B, the refractive index of the grating coupler 120 is 2.35 and the refractive index of the cladding layer 510 is 1. In other words, the cladding layer 510 is the air gap 1110 (see FIG. 11). In FIG. 17A, the step grating structure 120a and the blazed grating structure 120b have higher intensities than the slanted grating structure 120c. However, the slanted grating structure 120c still has high intensity when the incident angle is less than around 20 degrees. In FIG. 17B, the slanted grating structure 120c, the slanted grating structure 120d, the slanted grating structure 120e, and the slanted grating structure 120f have high intensities when the incident angle is less than around 40 degrees. The slanted grating structure 120f has a greater FOV than the slanted grating structure 120c.

Figure 18A:
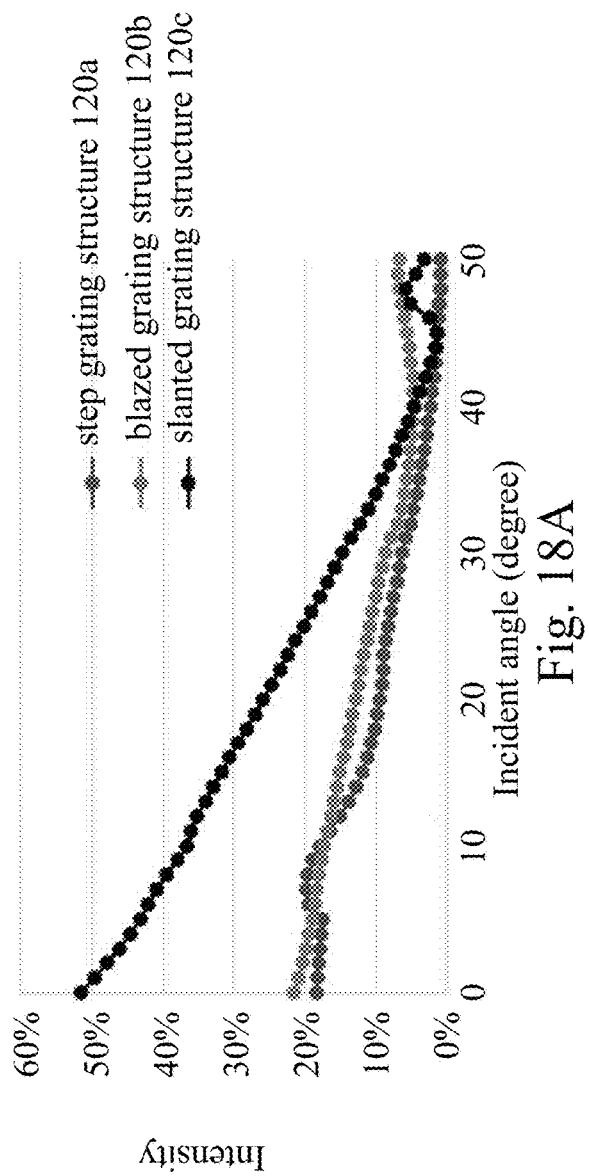
Figure 18B:
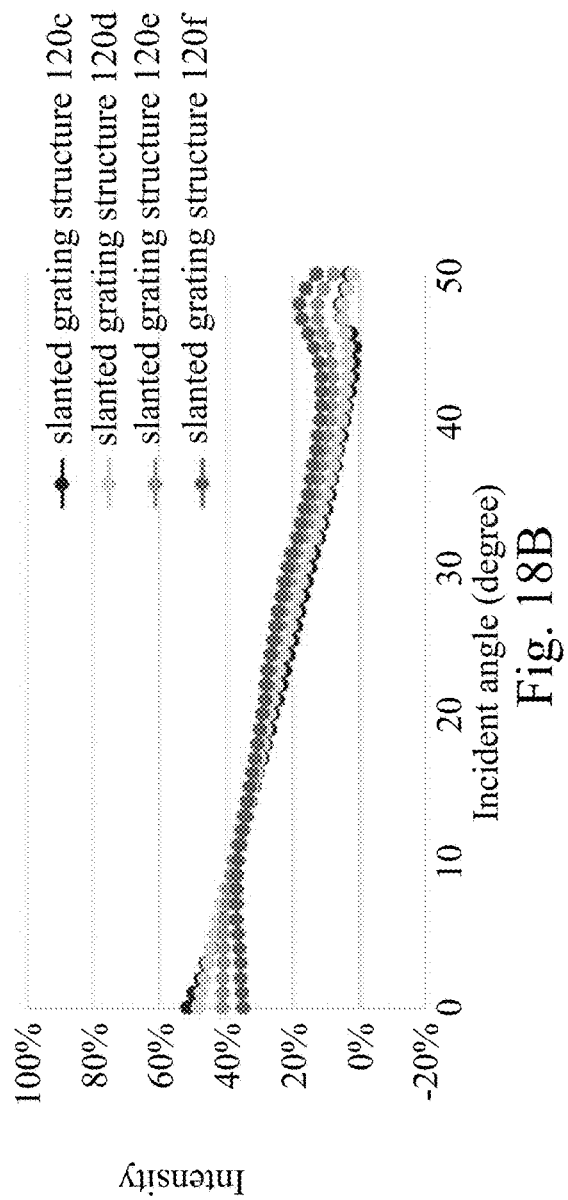

Please refer to FIG. 18A and FIG. 18B. In the simulation results of FIG. 18A and FIG. 18B, the refractive index of the grating coupler 120 is 1.9 and the refractive index of the cladding layer 510 is 1.47. In FIG. 18A, the slanted grating structure 120c has a higher intensity than those of the step grating structure 120a and the blazed grating structure 120b. In FIG. 18B, the slanted grating structure 120c, the slanted grating structure 120d, the slanted grating structure 120e, and the slanted grating structure 120f have similar intensities as the incident angle increases.

Figure 19A:
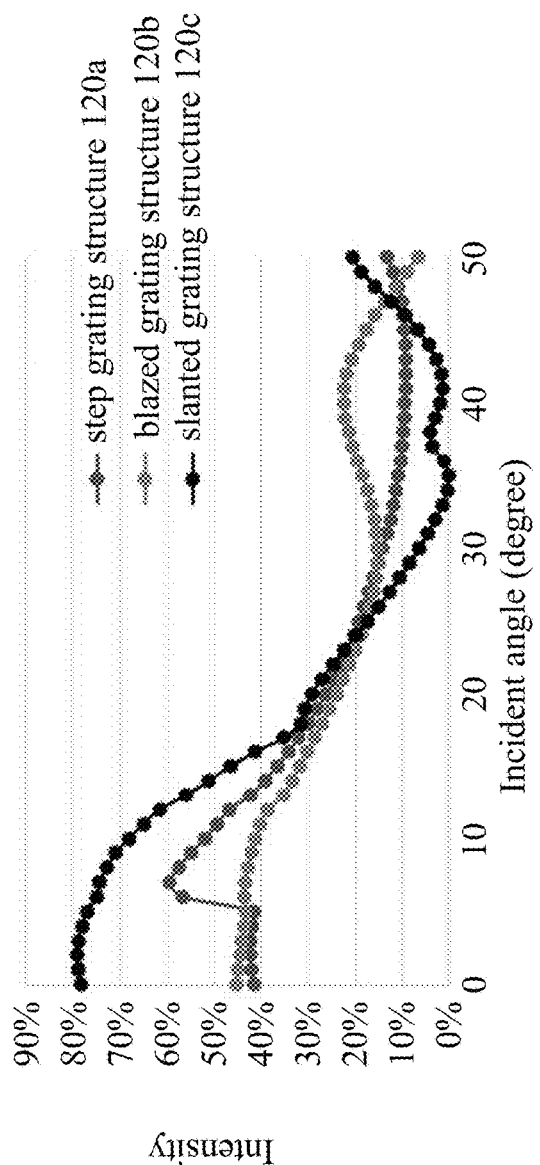
Figure 19B:
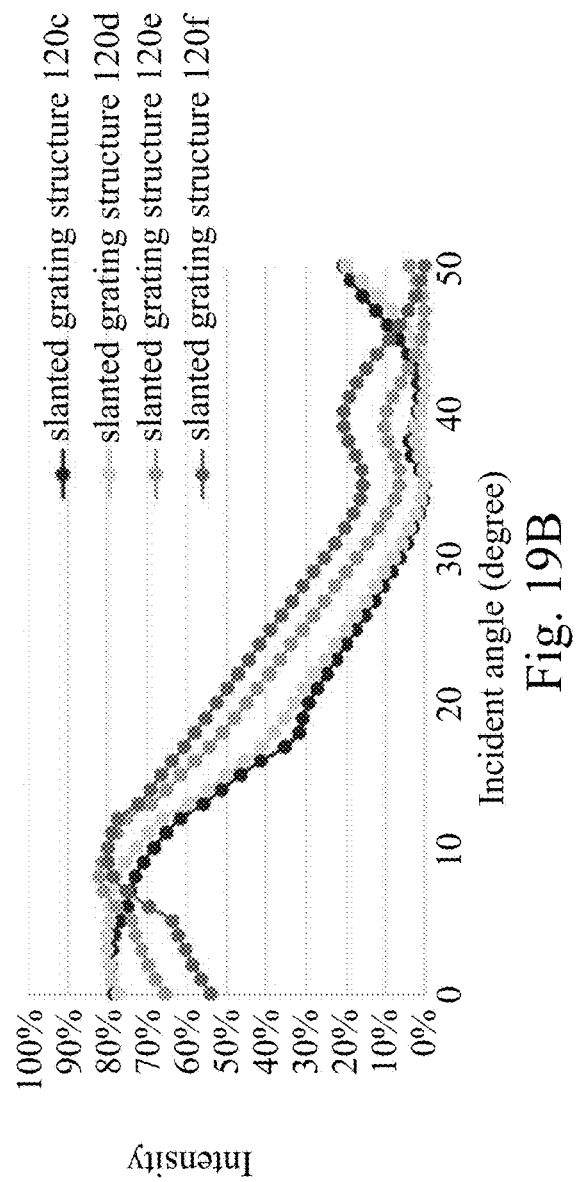

Please refer to FIG. 19A and FIG. 19B. In the simulation results of FIG. 19A and FIG. 19B, the refractive index of the grating coupler 120 is 2.35 and the refractive index of the cladding layer 510 is 1.47. In FIG. 19A, the slanted grating structure 120c has a higher intensity than those of the step grating structure 120a and the blazed grating structure 120b when the incident angle is less than around 20 degrees. In FIG. 19B, the slanted grating structure 120c, the slanted grating structure 120d, the slanted grating structure 120e, and the slanted grating structure 120f have high intensities when the incident angle is less than around 20 degrees.

Despite the fact that FIG. 16A to FIG. 19B show the simulation results of the green light GL having 532 nm wavelength, other lights having different wavelengths (for example, 488 nm and 633 nm) can be also simulated. In the simulation results, the step grating structure 120a, the blazed grating structure 120b, the slanted grating structure 120c-120f show good coupling efficiency and have a large field of view (FOV) to some extent.

The optical system of the present disclosure adjusts incident angles of the three separated RGB images emitting from an overlapped collimating colored image, and then converges the three RGB images on the same region of a grating coupler for coupling the three RGB lights with one grating coupler and one light-guide substrate having a high refractive index. Furthermore, the present disclosure provides a variety of grating structures, and those grating structures can provide high coupling efficiencies for visible wavelength, such as RGB lights. The present disclosure can reduce the pieces of the light-guide substrates and the fabrication cost of the grating couplers. Besides, the disclosed grating structures provide a greater field of view (FOV) and high coupling efficiency to satisfy one grating coupler can couple three wavelengths into a light-guide substrate with the same first refractive angle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical system, comprising:
a light module configured to emit three collimating beams from different positions;
an optical element below the light module and configured to change incident angles of the three collimating beams and to focus the three collimating beams at different incident angles at the same region of a first grating coupler,
wherein each of the three collimating beams has different wavelengths,
wherein the first grating coupler is below the optical element and is configured to couple the three collimating beams into a light-guide substrate such that the three collimating beams travel the same and overlapping optical path within the light-guide substrate, wherein the light-guide substrate is connected to the first grating coupler and is configured to transmit the three collimating beams; and a second grating coupler connected to the light-guide substrate and configured to enable the three collimating beams to depart from the light-guide substrate after the three collimating beams have traveled the same and overlapping optical path.

2. The optical system of claim 1, further comprising a cladding layer covering the first grating coupler, the second grating coupler, and the light-guide substrate, wherein a refractive index of the cladding layer is less than 1.6.

3. The optical system of claim 2, wherein the cladding layer is an air gap, and a thickness of the air gap is in a range from 0.1 mm to 100 mm.

4. The optical system of claim 2, further comprising a metal shielding between the optical element and the cladding layer.

5. The optical system of claim 2, wherein a refractive index of the light-guide substrate is greater than a refractive index of the cladding layer.

6. The optical system of claim 2, wherein a refractive index of the first grating coupler is greater than a refractive index of the cladding layer.

7. The optical system of claim 1, wherein the optical element is a prism or a microlens.

8. The optical system of claim 1, further comprising a metal shielding on the optical element.

9. The optical system of claim 1, further comprising a grating layer extending along a surface of the light-guide substrate, wherein the grating layer has a portion between the first grating coupler and the light-guide substrate.

10. The optical system of claim 9, wherein the first grating coupler is disposed in the grating layer, and a surface of the first grating coupler faces toward the light-guide substrate.

11. The optical system of claim 10, further comprising a metal layer disposed between the first grating coupler and the light-guide substrate.

12. The optical system of claim 9, further comprising a cladding layer covering the first grating coupler, the second grating coupler, and the light-guide substrate, wherein the grating layer is disposed between the light-guide substrate and the cladding layer.

13. The optical system of claim 1, wherein a refractive index of the light-guide substrate is in a range from 1.7 to 2.2.

14. The optical system of claim 1, wherein the first grating coupler comprises a step grating structure, the step grating structure comprises a first vertical sidewall, a second vertical sidewall, and a horizontal surface adjoining the first vertical sidewall and the second vertical sidewall.

15. The optical system of claim 14, wherein the step grating structure has n steps, where n is in a range from 3 to 32.

16. The optical system of claim 1, wherein the first grating coupler comprises a blazed grating structure, the blazed grating structure comprises an oblique sidewall extending from a top of the blazed grating structure to a bottom of the blazed grating structure, and a width of the blazed grating structure gradually increases from the top of the blazed grating structure to the bottom of the blazed grating structure.

17. The optical system of claim 1, wherein the first grating coupler comprises a slanted grating structure, the slanted grating structure comprises a first oblique sidewall, a second oblique sidewall, and a top surface adjoining the first oblique sidewall and the second oblique sidewall.

18. The optical system of claim 1, wherein the three collimating beams are three separated RGB images.

19. The optical system of claim 18, wherein the light module comprises a projector disposed above the optical element, wherein the projector is configured to provide the three separated RGB images.

20. The optical system of claim 19, wherein the light module further comprises a splitter disposed between the optical element and the projector, wherein the projector is configured to provide an overlapped colored image and the splitter is configured to separate the overlapped colored image into the three separated RGB images.

* * * * *